(12) United States Patent
Bonke et al.

(10) Patent No.: US 6,299,966 B1
(45) Date of Patent: Oct. 9, 2001

(54) EMBOSSED CLING WRAP

(75) Inventors: Doug Bonke, Appleton, WI (US); Jeffrey Nicoll, Chester, NH (US)

(73) Assignee: Reynolds Metals Company, Richmond, VA (US)

( * ) Notice: Subject to any disclaimer, the term of this patent is extended or adjusted under 35 U.S.C. 154(b) by 0 days.

(21) Appl. No.: 09/404,814

(22) Filed: Sep. 24, 1999

(51) Int. Cl.[7] .................. B32B 31/00; B32B 7/12
(52) U.S. Cl. .......... 428/173; 428/119; 428/120; 428/167; 428/182; 428/343
(58) Field of Search .................. 428/173, 343, 428/119, 120, 167, 182, 354, 355 RA

(56) References Cited

U.S. PATENT DOCUMENTS

| | | |
|---|---|---|
| 4,343,848 | 8/1982 | Leonard, Jr. . |
| 4,376,147 | 3/1983 | Byrne et al. . |
| 4,376,440 | 3/1983 | Whitehead et al. . |
| 4,397,905 | 8/1983 | Dettmer et al. . |
| 4,460,634 | 7/1984 | Hasegawa . |
| 4,522,203 | 6/1985 | Mays . |
| 4,546,029 | 10/1985 | Cancio et al. . |
| 4,556,595 | 12/1985 | Ochi . |
| 4,576,850 | 3/1986 | Martens . |
| 4,578,069 | 3/1986 | Whitehead et al. . |
| 4,587,152 | 5/1986 | Gleichenhagen et al. . |
| 4,655,761 | 4/1987 | Grube et al. . |
| 4,743,242 | 5/1988 | Grube et al. . |
| 4,946,527 | 8/1990 | Battrell . |
| 4,959,265 | 9/1990 | Wood et al. . |
| 5,013,595 | 5/1991 | Parry . |
| 5,073,421 | 12/1991 | Akao . |
| 5,080,957 | 1/1992 | Leseman et al. . |
| 5,141,790 | 8/1992 | Calhoun et al. . |
| 5,176,939 | 1/1993 | Shepherd . |
| 5,252,379 | 10/1993 | Kuribayashi et al. . |
| 5,308,666 | 5/1994 | Borchardt . |
| 5,316,861 | 5/1994 | Marchal et al. . |
| 5,344,693 | 9/1994 | Sanders . |
| 5,405,675 | 4/1995 | Sawka et al. . |
| 5,453,296 | 9/1995 | Lauritzen et al. . |
| 5,498,474 | 3/1996 | Schuhmann et al. . |
| 5,589,246 | 12/1996 | Calhoun et al. . |
| 5,618,618 | 4/1997 | Murschall et al. . |
| 5,662,758 | 9/1997 | Hamilton et al. . |
| 5,683,774 | 11/1997 | Faykish et al. . |
| 5,928,762 | 7/1999 | Aizawa et al. . |
| 5,965,235 | * 10/1999 | McGuire et al. ............... 428/156 |

* cited by examiner

*Primary Examiner*—Daniel Zirker
(74) *Attorney, Agent, or Firm*—Hunton & Williams

(57) ABSTRACT

A cling wrap comprising a first surface having an embossed area including a plurality of protrusions therefrom forming a plurality of raised contact surfaces and a base surface, wherein the total surface area of said raised contact surfaces comprises less than about 10 percent of the total surface area of the embossed area. An adhesive is applied to cover at least 80 percent of the embossed area. The cling wrap is acceptable for direct food contact and is sufficiently heat resistant for microwave re-heating.

43 Claims, 2 Drawing Sheets

EMBOSSED CLING WRAP

FIELD OF THE INVENTION

The present invention relates to an embossed, microwavable cling wrap having a first surface which is embossed and provided with an adhesive and a second non-adhesive surface. The cling wrap preferably includes at least one antistatic or anti-blocking agent. The cling wrap has a good balance of cling properties with handling properties such as tear bar resistance and the ability to separate the cling wrap from itself. The invention further relates to a method for making the microwavable cling wrap.

BACKGROUND OF THE INVENTION

Thermoplastic resin films are used as household cling wraps to contain food and other items by clinging to one or more surfaces of the container in which the food is housed or to itself to thereby provide a seal which reduces the degree of exposure of the contents of the container to the environment. A necessary characteristic of such film wrap is the ability to "cling", that is, to adhere to itself or to form a tight seal with other surfaces, as when the film is used as a cover for containers. These films can be employed to preserve the freshness and moisture content of wrapped food items and to prevent the migration of food odors.

Thermoplastic resin films do not generally possess inherent cling characteristics sufficient to adhere satisfactorily to themselves and other surfaces. The cling characteristic of thermoplastic films is generally obtained through the use of so-called cling agents or adhesives. Adhesives are chosen for their ability to produce a surface on a thermoplastic film that can be sealed, opened and resealed, and are selected with due care in consideration of the use of thermoplastic films in direct food contact applications.

A balance must be attained between the film's "cling" and "handling" or "handleability" characteristics. "Handleability" is the characteristic of the film to resist inadvertent clinging to itself and to other surfaces during use. While cling agents impart good cling properties to the film, it has generally been observed that an increase in the amount of adhesives incorporated into the film to enhance the cling provides a corresponding decrease in the handleability of the film. With an increased adhesive amount, the tendency of the film to inadvertently adhere to itself and to other surfaces increases. One type of inadvertent sticking is known as premature sticking, that is, before the adhesive coated film can be properly positioned over a target surface, inadvertent contact of the adhesive with the target surface or the cling wrap itself causes premature sticking at one or more positions, thereby inhibiting proper positioning of the cling wrap for use. Moreover, with the increased use of microwave ovens, it has become desirable for food cling wraps to be used in microwave re-heating applications.

Embossed films are well known in the art. For instance, U.S. Pat. No. 5,662,758 to Hamilton, et al., ("Hamilton") describes a method for making a flexible film having pressure sensitive adhesive protected from inadvertent adherence. The method coats a forming screen with an interconnected layer of pressure sensitive adhesive and places a piece of flexible film in contact with the layer of adhesive. The layer of adhesive preferentially adheres to the piece of flexible film. The forming screen has a plurality of recesses therein. The coating step applies the layer of adhesive without bridging the recesses. Another step forms the flexible film to create a plurality of protrusions that are registered with the interconnected layer of pressure sensitive adhesive by virtue of using the same screen to transfer adhesive and to form the protrusions. The forming screen may be wrapped around a rotating drum and the piece of flexible film may be a portion of a continuous web of flexible film. The adhesive in Hamilton only covers the raised surfaces.

SUMMARY OF THE INVENTION

It is an object of the present invention to provide cling wraps having a good balance of cling and handleability characteristics. It is another object of the present invention to provide microwavable cling wraps that are acceptable for direct food contact. It is yet another object of the present invention to provide single-or multi-layer cling wraps made from polyolefinic resins. Other objects of the invention will become apparent to those skilled in this art from the following description.

In its broadest sense, the present invention relates to a cling wrap which includes a first embossed surface provided with an adhesive on at least about 80 percent of the embossed area of the first surface, and a second surface that is essentially free of adhesive. The cling wrap preferably contains at least one antistatic and/or anti-blocking agent to improve the handleability of the cling wrap. The cling wrap is embossed to provide a plurality of protrusions or textured elements creating a plurality of raised surfaces and a base surface. The raised surfaces of the embossed area of the cling wrap should constitute less than about 10 percent of the total surface area of the embossed area. The embossing reduces the amount of surface contact between the first surface of the cling wrap with the surface of an adjacent layer of cling wrap when the wrap is positioned on a dispensing roll.

The invention further relates to a method for making the microwavable cling wrap including the steps of extruding a polymer film, embossing at least one surface of the cling wrap and applying a pressure sensitive adhesive to at least a portion of the embossed surface. The method is advantageous due to its simplicity and because a high quality product can be consistently prepared in this manner.

DETAILED DESCRIPTION OF THE INVENTION

Figure 1:
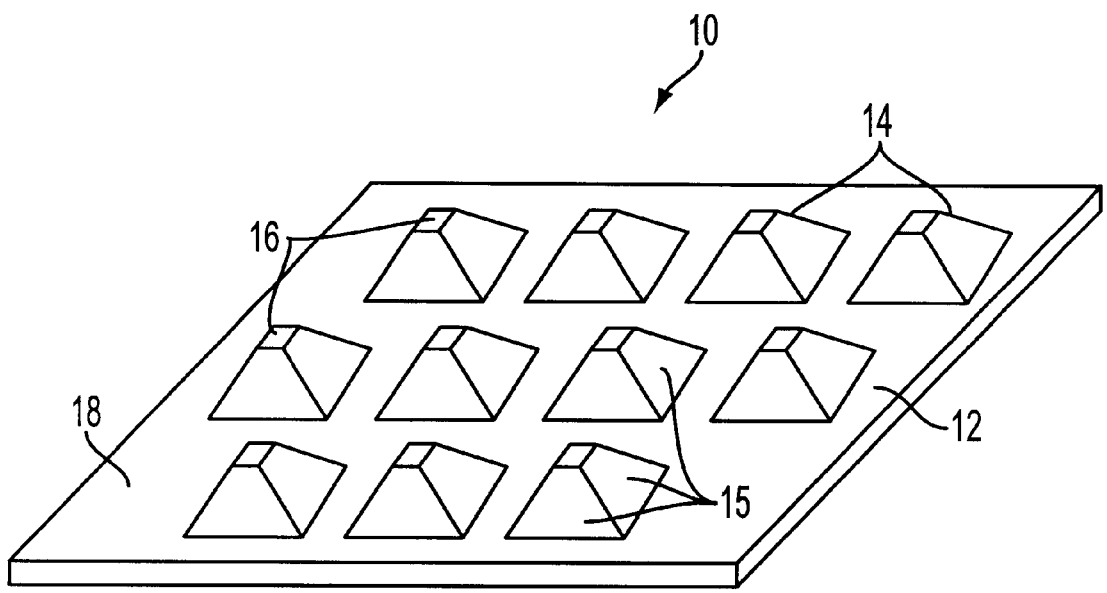
FIG. 1 is a schematic, top perspective view of one embodiment of the cling wrap of the present invention.

The present invention is directed to a microwavable cling wrap including a first surface that is provided with an embossed area and an adhesive and a second surface that is essentially free of adhesive. The cling wrap is embossed to provide a plurality of protrusions that form a plurality of raised surfaces located above a base surface. The adhesive is applied to at least about 80 percent of the embossed area and may cover the total surface area of the cling wrap including the raised surfaces and the base surface. The protrusions are sufficiently high to substantially prevent the adhesive located on the base surface from contacting the second surface of the cling wrap or other surfaces during winding and handling of the cling wrap prior to its application, thus providing good handleablility of the cling wrap.

The geometry and frequency of the protrusions should be such as to minimize the total surface area of the raised surfaces since these raised surfaces are destined for direct contact with the second surface of an adjacent layer of cling wrap when the wrap is wound on a dispensing roll. On the other hand, the protrusions must have sufficient strength to support nominal pressures such as those experienced during winding and handling of the cling wrap. Preferably, the embossed area contains 150–250 protrusions per square inch and more preferably about 190–230 protrusions per square inch.

The protrusions must also be capable of substantially collapsing under moderate pressure such as would be applied when pressing the cling wrap onto an object with the intention of causing the cling wrap to cling to the object. The total surface area of the raised surfaces which contacts the second surface of an adjacent layer of cling wrap during winding and handling (hereinafter "contact area"). Generally, the contact area comprises less than about 10 percent of the total embossed area, preferably from about 3 percent to about 8 percent of the total embossed area and most preferably from about 4 percent to about 6 percent of the total embossed area.

The protrusions may be of any suitable shape although preferred shapes are those which minimize the raised surface area while providing sufficient strength to resist collapse during winding and routine handling. Suitable shapes for the protrusions include cones, pyramids, cylinders, and frustums of cones or pyramids. The plurality of protrusions may be formed by thermoforming via application of heat to the cling wrap and mechanically embossing the cling wrap into a rubber surface from the opposite surface of the cling wrap with a metal roll. Such thermoforming methods are well known in the art, as are other methods of embossing polyolefin films such as those employed to fabricate the cling wrap of the present invention.

Each protrusion preferably has a height of about three to about five times the total thickness of the cling wrap, preferably about three times the thickness of the cling wrap to thereby provide a sufficient spacing between the base surface and the second surface of the adjacent layer of the cling wrap while at the same time minimizing the total thickness of the cling wrap so that a maximum amount of cling wrap can be stored on a single roll. Typically, the maximum height of the protrusions is about 4.0 mils with a more preferred height being in the range of from about 1.0 to about 3.0 mils, and more preferably from about 1.5 to about 2.5 mils. Preferably, the plurality of the protrusions are formed after fabrication of the film material which forms the cling wrap in order to best preserve the optical clarity of the cling wrap.

The embossed surface is provided with a food grade, pressure-sensitive adhesive layer which covers at least about 80 percent and preferably at least 90 percent of the embossed area of the embossed surface. The adhesive is more preferably applied to substantially the entire surface of the embossed area and in this embodiment would cover both the raised surfaces and the base surface. In this embodiment, minimizing the surface area of the raised surfaces serves to reduce the tendency of the pressure sensitive adhesive applied to those surfaces from sticking to an adjacent layer of cling wrap on a dispensing roll.

Any suitable pressure-sensitive, food grade adhesive may be applied to the embossed area of the cling wrap of the present invention. Suitable adhesives include, among others, acrylics, acrylic or polyvinyl acetate copolymers, silicones, urethanes, styrenic copolymers, rubbers, polyvinyl alcohol and thermoplastic elastomers. Pressure sensitive adhesives employed in surgical tapes, transdermal drug delivery patches and food stickers may also generally be employed, if they are compatible with other materials in the specific cling wrap.

Preferred adhesives are elastomeric, pressure sensitive adhesives that are optically clear. A preferred adhesive comprises a solvent in an amount of from about 70 to about 93 percent by weight, a high molecular weight polyisobutylene in an amount of from about 0.5 to about 5 percent by weight, a low molecular weight polyisobutylene in an amount of from about 5 to about 15 percent by weight and a purified hydrocarbon resin tackifier in an amount from about 1 to about 10 percent by weight, based on the total weight of the adhesive mixture, and wherein said low molecular weight polyisobutylene and said high molecular weight polyisobutylene have a molecular weight ranging from about 25,000 to about 60,000 and from about 500,000 to about 1,200,000, respectively. Most preferably, the pressure sensitive adhesive for use in the present invention comprises a low molecular weight polyisobutylene such as Vistanex™ LM-MS-LC, a high molecular weight polyisobutylene such as Vistanex™MM L-80 and a tackifier such as Escorez™ 1310 LC, all of which preferred materials are available from Exxon™ Chemical. The adhesive is preferably dissolved in a solvent such as Isopar™ G available from Exxon. The pressure sensitive adhesive is preferably capable of sealing the cling wrap to a variety of surface materials including at least plastic, wood, ceramic, glass, steel and aluminum.

The adhesive may be applied at an application rate that delivers from about 0.2 to about 1.5 milligrams per square inch, preferably from about 0.3 to about 1.0 milligrams per square inch based on the amount of dried adhesive applied to the film surface. The optimum application rate for the adhesive depends on the particular resin or resins employed to fabricate the cling wrap, the percentage of the raised surfaces, the type of the adhesive and the type and amount of antistatic and/or anti-blocking agents which are formulated into the cling wrap. The adhesive is formulated and applied to provide an adhesive strength that is greater than the elastic recovery of the embossed protrusions, thus affording a lasting and complete bond upon collapse of the protrusions until such time as the cling wrap is intentionally removed from the substrate.

Preferably, the cling wrap of the present invention further includes at least one antistatic and/or anti-blocking agent formulated at least in the outer layer or layers of the cling wrap. Antistatic agents are used primarily to prevent the cling wrap from sticking to itself to thereby improve the handleability of the cling wrap particularly during winding and dispensing of the cling wrap. In addition, the antistatic agent functions to reduce the tear resistance in the transverse direction of the cling wrap to make it easier to tear off of a dispensing roll, inhibits static electricity accumulation and improves the slip characteristics of the cling wrap.

Suitable antistatic agents for use in the present invention include, but are not limited to, nonionic internal antistatic agents including amine-based antistatic agents such as, ethoxylated tertiary amines, as well as ethanolamines and ethanolamides. Other suitable food grade antistatic agents which are compatible with the polyolefin materials employed to fabricate the cling wrap as well as with the adhesive may also be employed. A preferred antistatic agent is diethanolamine.

The antistatic agent is preferably incorporated into the cling wrap in amounts of from about 0.05 to about 0.5 percent by weight, and more preferably from about 0.1 to about 0.4 percent by weight, based on the total weight of the cling wrap. A particularly preferred range for the antistatic agent is from about 0.15 to about 0.25 percent by weight, based on the total weight of the cling wrap.

Handleability of the cling wrap may also be improved through the optional use of anti-blocking agents. Anti-blocking agents tend to prevent the cling wrap from sticking to itself. Anti-blocking agents suitable for use in cling wraps include, but are not limited to, diatomaceous silica, such as those commercially available under the tradenames "SUPERFLOSS", "SILVERFROST", and "CELITE" which are silica products of the Johns-Manville company. Preferably the concentration of the anti-blocking agent incorporated into the cling wrap may range from about 100 to about 10,000 ppm and more preferably from about 1,000 to about 3,000 ppm. Other anti-blocking agents known to those skilled in the art may also be employed such as calcium carbonate and talc.

The cling wrap of the present invention can be fabricated from a single- or multi-layer film. A preferred embodiment of the invention is directed to a multi-layer cling wrap comprising a core layer and at least one outer layer of a polyolefin resin on either side of the core layer. The outer layers are made of a polyolefinic resin having a high melting point and resistance to heat for use in direct food contact for microwave cooking and/or microwave re-heating.

Preferably the outer layers of the multi-layer cling wrap are made of a polypropylene polymer having a melt flow rate (MFR) of at least 10, more preferably from about 20 to about 50 and most preferably from about 30 to about 40 grams per 10 minutes. Polypropylene resins with a lower melt flow rate than about 10 will make the plastic wrap very difficult to tear off of a dispensing roll and are not recommended. Other suitable polyolefinic materials that can be used in the outer layers include polypropylenes with a small amount of ethylene incorporated therein.

Higher contents of ethylene may also be used, but will cause the film to have reduced microwaveability.

The core layer may be made of a polyolefinic resin and should exhibit low permeability to moisture and food odor. The core layer is preferably made of low density polyethylene (LDPE) having a density of from about 0.920 to about 0.935, preferably of from 0.922 to about 0.932, and more preferably of from about 0.925 to about 0.930, grams per cubic centimeter, and a melt index (MI) of from about 0.5 to about 5, preferably of from about 1 to about 5, more preferably of from 2.5 to about 3.5 grams per 10 minutes.

Linear low density polyethylene (LLDPE) may also be used or combinations of linear low density polyethylene and low density polyethylene. The overall thickness of the film forming the core and outer layers is preferably from about 0.4 to about 0.6 mils. The overall layer ratio of a three layer film based on weight, may range from about 15/70/15 to about 30/40/30 depending on the exact polyolefinic material chosen for each layer. The desired layer ratios are controlled by setting the mass throughput for each of the layers in the extruder.

The surface of one outer layer includes the embossed area and an adhesive as discussed above. The outer layer with the adhesive is also referred to as the outer adhesive layer. The adhesive may be sprayed on the embossed area of the outer adhesive layer as described earlier or it may be added as a component in the outer adhesive layer and so that it diffuses slowly over time to the surface of the outer adhesive layer. In the latter embodiment the adhesive components are included in the outer layer in an amount effective to keep the surface of the embossed area sufficiently tacky to adhere to a variety of surfaces over a period of at least 6 months, preferably at least 1 year. An effective amount may range from about 20 to about 70 percent by weight, preferably 40 to about 60 percent by weight and more preferably from about 40 to about 50 percent by weight.

Preferably the adhesive may be an adhesive comprising hydrocarbon resin tackifiers and low molecular weight polyisobutylene as described earlier and/or an amorphous polyolefin ("APO") material having a molecular weight of from about 1,000 to about 10,000. Examples of APO's include Eastoflex™ P1023 which is an amorphous polypropylene homopolymer material having a molecular weight of about 2,250 and Eastoflex™ E1060 which is an amorphous copolymer of propylene and ethylene and has a molecular weight of about 6,000. These materials are available from Eastman Chemical. An APO material may be used alone but is preferably used in addition to an adhesive such as an adhesive comprising hydrocarbon resin tackifiers and low molecular weight polyisobutylene. In one embodiment of the present invention an APO material and an adhesive comprising a hydrocarbon tackifier and a low molecular weight polyisobutylene are added in the adhesive outer layer in amounts of from about 10 to about 20 percent by weight and from about 20 to about 40 percent by weight based on the total weight of the adhesive outer layer, respectively. The adhesive and/or APO's are added to the outer layer by mixing the adhesive and/or APO's in with a polymeric material prior to forming the multi-layer film through extrusion. It is believed that the APO materials do not migrate within the outer adhesive layer, but that they enhance its adhesion by modifying its crystalline structure.

The other outer layer or non-adhesive layer will generally have a plurality of recesses that correspond to the plurality of protrusions of the embossed area. One or both of the outer layers preferably contain at least one antistatic agent in the amounts given above. The outer layers may also contain an anti-blocking agent, in an amount of from about 100 to about 10,000 ppm, preferably from about 1,000 to about 3,000 ppm.

The resistance to tearing of the cling wrap of the present invention on a standard dispensing roll tear bar should be less than about 500 grams, preferably from about 50 grams to about 400 grams, and more preferably from about 50 grams to about 150 grams.

Any suitable bonding material or method may be employed to bond the core layer to each of the outer layers in the three layer embodiment of the cling wrap of this invention. Preferably, however, the three-layer cling wrap is formed by coextrusion. The embossing step follows the formation of the three-layer film to preserve the film's clarity and it can occur before or after the application of the adhesive. Preferably, the embossing step occurs before the application of the adhesive. Preferably, the co-extruded wrap is quenched to about 80° F. (26.7° C.) to about 90° F. (32.2° C.), and then the wrap is reheated to soften it, prior to subjecting it to the embossing step. After embossing the film may be re-quenched to preserve its dimensional and structural stability.

Referring now to FIG. 1 there is shown a specific embodiment of the present invention wherein the cling wrap is generally indicated as 10. The cling wrap 10 has a first surface which is embossed with a plurality of protrusions (or textured elements) 14 to form an embossed area 12 having a plurality of side surfaces 15, a plurality of contact areas 16 and a base area 18. In this embodiment, each protrusion 14 has the shape of a four-sided frustum of a pyramid. The geometry and frequency of the protrusions 14 is such as to create a total surface area of the contact area 16 that is about 6 percent of the total surface area of the embossed area 12 of the cling wrap 10. The height of each protrusion 14 is about three times the overall thickness of the cling wrap 10. The projections 14 have sufficient strength to prevent inadvertent crushing during normal winding and handling of the cling wrap 10, yet are sufficiently flexible that they will collapse under moderate pressure such as may be exerted to seal the cling wrap 10 to a substrate.

A pressure sensitive adhesive layer is applied to the embossed area 12 to cover at least 80 percent of the total embossed area 12, preferably at least 90 percent of the total embossed area and more preferably substantially the entire embossed area is covered. The adhesive base polymer is compounded with a tackifying resin and put into solution or emulsion so as to allow spray application onto the embossed area 12. The adhesive is applied at a coating rate sufficient to allow about 0.2 to about 1.5 milligrams per square inch, preferably about 0.3 to about 1.0 milligrams per square inch of dried adhesive to be present on the film in the adhesive covered area.

Figure 2:
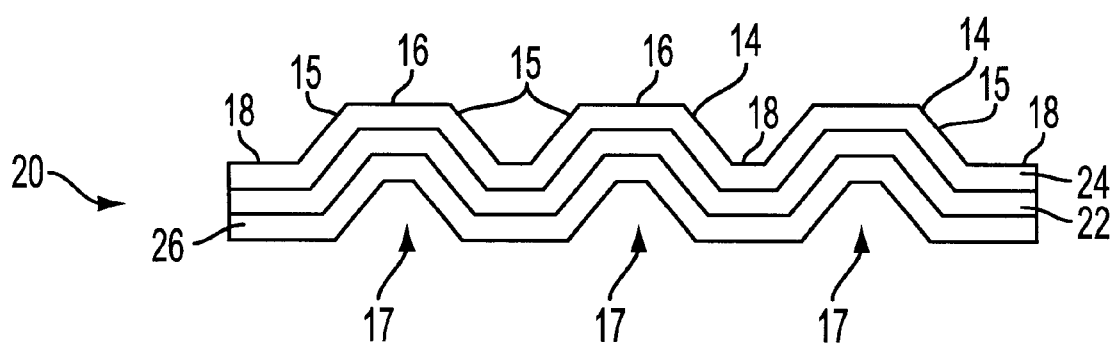
FIG. 2 is a schematic, cross-sectional view of another embodiment of the present invention which employs a three layer cling wrap.

The cling wrap of the present invention can be a single or multi-layer film. A preferred embodiment of the cling wrap that employs a three-layer film is shown in FIG. 2. In reference to FIG. 2 cling wrap 20 comprises a core layer 22 and two outer layers 24 and 26. Outer layers 24 and 26 are preferably made of a homopolymer of polypropylene having a melt flow rate of about 35 grams per 10 minutes and a density of about 0.905 grams per cubic centimeter. Polypropylene is used to fabricate the outer layers 24, 26 to thereby render the cling wrap 20 suitable for microwave re-heating. The cling wrap 20 has a first surface having an embossed area having a plurality of protrusions 14 that form a plurality of side surfaces 15, a plurality of raised contact surfaces 16 and a base surface 18. The cling wrap 20 has a second surface which has a plurality of recesses 17 that correspond to the protrusions 14 of the first surface. The adhesive coating is applied to cover at least 80 percent of the embossed area.

The core layer is preferably made of a low density polyethylene (LDPE) having a density of about 0.930 grams/cm$^3$ and a melt index of about 3.0 grams per 10 minutes. The overall thickness of the film is about 0.5 mils. The outer layers 24, 26 contain an antistatic or anti-blocking agent which is formulated into the material of the outer layers 24, 26 prior to co-extrusion of the three-layer structure by, for example, blending a antistatic and/or anti-blocking agent concentrate in polypropylene into the polypropylene film material.

The multi-layer cling wrap of this invention may be produced by any of several well-known methods. Preferably, the cling wrap may be produced by slot cast film extrusion. The cling wrap may also be produced by what is commonly known as the air blown film tubular extrusion method, but this latter method is less preferred. Various antistatic agents and/or anti-blocking agents, as discussed above, can be incorporated into the outer layers of the multi-layer films of this invention by mixing the agents with the resin, preferably prior to extrusion thereof. For better control, it is preferred to mix the antistatic agent and/or the anti-blocking agent with all of the resin of a particular layer to a final concentration, rather than master batching the additive to the resin. The multi-layer film may be slot cast on conventional extrusion equipment using a multi-manifold slot cast die or a conventional single-manifold slot cast die and multi-layer adapter for the slot cast die. A preferred method uses the multi-manifold slot cast die because of the viscosity differences of the polypropylene and LDPE layers. The multi-manifold slot cast die optimizes the uniformity of the layer ratio which in turn affects the tear resistance of the cling wrap.

The co-extruded film may then be quenched to about 80–90° F. (26.7–32.2° C.), then reheated to soften it prior to the embossing step. The embossed cling wrap may be subsequently re-quenched to improve its structural and dimensional stability. The multi-layer cling wrap of this invention can be cut to a preferred width, for example about 12 inches to about 18 inches, wound on cardboard cores, and packaged in dispensing cartons having a conventional cutter device, such as a conventional metal sawtooth edge tear bar.

The invention will become more apparent when considered together with the following examples, which are set forth as being merely illustrative of the invention and which are not intended, in any manner, to be limiting. The scope of the invention is to be determined from the claims appended hereto. Unless otherwise indicated, all parts and percentages are by weight.

EXAMPLES

Example 1

A three-layer, co-extruded film was made having a core layer and two outer layers A and C. Layer A was made of polypropylene having an MFR of 35 grams per 10 minutes and containing about 0.25 percent by weight of diethanolamine antistatic agent. Layer B was made from low density polyethylene having an MFR of 3 grams per 10 minutes and a density of about 0.930 grams/cm$^3$. Layer C was made from polypropylene having an MFR of 35 grams per 10 minutes.

The film was embossed with a plurality of protrusions protruding from the C layer. The protrusions had the shape of the frustum of a pyramid. The raised contact area of the protrusions constitutes about 6 percent of the total embossed area of the film. The protrusions prevent film blocking when in roll form and enhance dispensing from the dispensing roll. The film was made by co-extruding the three layers using a multi-die extruder.

The co-extruded film was quenched to about 80–90° F. (26.7–32.2° C.) and then post-embossed. The film was passed between a nip system consisting of a textured metal roll heated to about 280° F. (137.8° C.) and a rubber roll. The action of passing the co-extruded film through the nip between the textured roll and the rubber roll at an elevated temperature formed a plurality of protrusions, each having the shape of the frustum of a pyramid. The film exiting the embossing station was then rapidly cooled, thus thermoforming the protrusions at a height roughly three times the thickness of the 0.5 mil thick cling wrap. The weight percentages of each layer A, B and C based on the total cling wrap weight was about 25/50/25, respectively.

An adhesive mixture comprising about 85 percent by weight of ISOPAR G as a solvent, about 8 percent by weight of VISTANEX™ LM-MS-LC, which is a low molecular weight polyisobutylene having a molecular weight of 38,000 to 50,000, about 1 percent by weight of VISTANEX™ MM L-80, which is a high molecular weight polyisobutylene having a molecular weight of 700,000 to 1,200,000 and about 4 percent by weight of a tackifier, ESCOREZ™ 1310LC, was sprayed onto the embossed area of Layer C to cover substantially the entire surface of the embossed area.

The adhesive was sprayed on the C layer at a coating rate that delivered about 0.45 grams of dried adhesive per square inch.

Example 2

The three-layer cling wrap as in Example 1, except that the antistatic agent was added in both layers A and C. The antistatic agent did not interact with the prayed adhesive.

Example 3

The three-layer cling wrap as in Example 1 is made in the same way except hat the adhesive is added in the polypropylene batch of the C layer prior to forming the co-extruded plastic wrap in an amount of about 20 to about 40 percent by weight of the C layer. In the formed cling wrap the adhesive tackifier and polyisobutylene in the C layer diffuse from within the layer to the outer surface of layer C and provide an outer film surface that is always tacky on all surfaces i.e. the base surface, as well as the sides and top of the pyramid frustum protrusions.

Example 4

The three-layer cling wrap as in Example 1 is made in the same way except that the adhesive of Example 1 is added in the polypropylene batch of the C layer prior to forming the co-extruded plastic wrap in an amount of about 10 to about 20 percent by weight of the C layer. In addition, Eastoflex™ P1023 which is an amorphous polypropylene material that has a molecular weight of about 1,000 is also added in the polypropylene batch of the C layer in an amount ranging from about 20 to about 40 percent by weight of the total weight of the C layer. The Eastoflex™ P1023 enhances the adhesion of the outer film surface by changing the crystalline structure of the polypropylene.

Example 5

The three-layer cling wrap as in Example 4 except that Eastoflex™ E1060 which is an amorphous copolymer of propylene and ethylene of about 6,000 molecular weight is used instead of Eastoflex™ P1023.

Example 6

The three-layer cling wrap as in Example 1 except that an amorphous polyolefin material such as Eastoflex™ P1023 or Eastoflex™ E1060 is used instead of the adhesive of Example 1.

Example 7

The cling wrap as in Example 1 was made in the same way except that the weight percentage of each layer A, B and C was about 30/40/30, respectively.

Example 8

The cling wrap as in Example 1 was made in the same way except that the weight percentage of each layer A, B and C was about 20/60/20, respectively.

Example 9

The three-layer cling wrap as in Example 1 is made in the same way except that the core layer B is made from LLDPE having an melt index (MI) of about 3 and a density of about 0.918 gm/cm$^3$.

Example 10

The three-layer cling wrap as in Example 1 is made in the same way except that the core layer B is made from a mixture of LLDPE and LDPE having an average MI of about 3 and a density of about 0.920 gm/cm$^3$.

Example 11

The three-layer cling wrap as in Example 1 is made in the same way except that the core layer B is made from polypropylene resin having a melt flow rate (MFR) of 35 grams per 10 minutes and a density of about 0.905 grams/cm$^3$. The core layer has a diethanolamine antistatic agent in an amount of about 0.25 percent by weight, based on the total weight of the core layer, to lower the tear resistance of the core layer in the transverse direction. The presence of antistatic agent in layers A and B allows for the film to have a low tear resistance.

Examples 12–13

A three-layer cling wrap as in Example 1 was made in the same way except that the outer layers A and C are made of polymethylpentene (PMP) in one embodiment (Example 8), and PMP copolymer in another embodiment (Example 9). The same antistatic agent as in example 1 is used in an amount of about 0.3 percent by weight.

Example 14

A three-layer cling wrap as in Example 1 is made except that the adhesive is sprayed on layer A. Layer C contains an antistatic agent. The film is embossed with protrusions from the C layer as in Example 1. Thus, the A layer is tacky on its surface and inside the protrusions. The C layer with antistatic agent, helps to prevent roll blocking. The three-layer film of this example has essentially the same end use functionality as the three-layer film of Example 1.

Example 15

A two-layer film is made by co-extruding two layers made from polypropylene having an MFR of about 35 and a density of about 0.905 grams/cm$^3$. The first layer contains from about 0.25 to about 0.5 percent by weight of diethanolamine. The film is embossed as in Examples 1 and 2. The second layer contains an adhesive mixture such as the one used in Example 1 in an amount of about 20 to 70 percent by weight based on the total weight of the second layer. The adhesive diffuses over time to the surface of the second layer keeping that surface constantly tacky over an extended period.

Example 16

A three-layer film as in Example 1 is made except that the core layer further comprises an additional oxygen barrier layer made from ethylene vinyl alcohol, polyester or nylon. The film exhibits a good balance of cling and handleability characteristics and provides an improved barrier to oxygen when compared to the three-layer structure of Example 1.

The foregoing examples have been presented for the purpose of illustration and description only and are not to be construed as limiting the scope of the invention in any way. The scope of the invention is to be determined from the claims appended hereto.

What is claimed is:

1. A cling wrap which comprises:
   a first surface having an embossed area including a plurality of protrusions therefrom forming a plurality of raised contact surfaces and a base surface, wherein the total contact area of said raised contact surfaces is less than about 10 percent of the total surface area of the embossed area;

an adhesive coating applied to cover at least 80 percent of the embossed area;

a second surface that is essentially free of adhesive; and wherein said cling wrap is suitable for direct contact with food and is sufficiently heat resistant for microwave re-heating.

2. The cling wrap of claim 1 comprising a polyolefin resin.

3. The cling wrap of claim 2 comprising one or more resins selected from the group of polyethylene and polypropylene resins.

4. The cling wrap of claim 1 wherein the total area of the raised contact surfaces is from about 3 to about 8 percent of the total surface area of the embossed area.

5. The cling wrap of claim 1 further comprising an effective amount of an antistatic agent to improve the handleability of the cling wrap.

6. The cling wrap of claim 5 wherein the antistatic agent comprises diethanolamine.

7. The cling wrap of claim 1 wherein the adhesive is a direct food contact grade, pressure sensitive adhesive.

8. The cling wrap of claim 7 wherein the adhesive is an optically clear, elastomeric pressure sensitive adhesive.

9. The cling wrap of claim 1 wherein the antistatic agent is selected from the group consisting of ethanolamines and ethanolamides.

10. The cling wrap of claim 1 wherein the adhesive comprises a solvent in an amount of from about 70 to about 93 percent by weight, a high molecular weight polyisobutylene in an amount of from about 0.5 to about 5 percent by weight, a low molecular weight polyisobutylene in an amount of from about 5 to about 15 percent by weight and a purified hydrocarbon resin tackifier in an amount from about 1 to about 10 percent by weight, based on the total weight of the adhesive mixture, and wherein said low molecular weight polyisobutylene and said high molecular weight polyisobutylene have a molecular weight ranging from about 25,000 to about 60,000 and from about 500,000 to about 1,200,000 respectively.

11. The cling wrap of claim 1, having a tear bar resistance force of about 25 grams to about 400 grams.

12. The cling wrap of claim 1, wherein said adhesive covers at least 90 percent of the surface of embossed area.

13. The cling wrap of claim 1, wherein the adhesive covers substantially the entire surface of the embossed area.

14. A cling wrap comprising a core layer, and two outer layers, wherein at least one outer layer comprises an embossed area having a plurality of protrusions forming a plurality of raised contact surfaces and a base surface, an adhesive covering at least 80 percent of the embossed area and wherein the raised contact surfaces comprise less than about 10 percent of the total surface area of the embossed area.

15. The cling wrap of claim 14, comprising a polyolefinic resin.

16. The cling wrap of claim 15, comprising at least one polyolefinic resin selected from the group consisting of polyethylene and polypropylene resins.

17. The cling wrap of claim 14, wherein the contact area of the raised surfaces comprises from about 3 to about 8 percent of the total surface area of the embossed area.

18. The cling wrap of claim 14, wherein said outer layers comprise an effective amount of an antistatic agent to improve the handleability of the cling wrap.

19. The cling wrap of claim 18, wherein said antistatic agent comprises diethanolamine.

20. The cling wrap of claim 14, wherein said adhesive is a pressure sensitive adhesive suitable for direct contact with food.

21. The cling wrap of claim 14, wherein said adhesive is an optically clear, elastomeric pressure sensitive adhesive.

22. The cling wrap of claim 14, wherein said antistatic agent is selected from the group consisting of amines and ethanolamides.

23. The cling wrap of claim 14, wherein said adhesive comprises a solvent in an amount of from about 70 to about 93 percent by weight, a high molecular weight polyisobutylene in an amount of from about 5 to 15 percent by weight, and a purified hydrocarbon resin tackifier in an amount from about 1 to about 10 percent by weight, all based on the total weight of the adhesive mixture, and wherein said low molecular weight polyisobutylene and said high molecular weight polyisobutylene have a molecular weight ranging from about 25,000 to about 60,000, and from about 500,000 to about 1,200,00, respectively.

24. The cling wrap of claim 14, having a tear bar resistance force of about 25 grams to about 400 grams.

25. The cling wrap of claim 14, wherein said core layer is made from a low density polyethylene and said two outer layers are made from polypropylene.

26. The cling wrap of claim 14, wherein the adhesive covers at least 90 percent of the total surface of the embossed area.

27. The cling wrap of claim 14, wherein the adhesive covers substantially the entire surface of the embossed area.

28. A cling wrap comprising:

a core layer and two outer layers, wherein at least one of the outer layers comprises an embossed area having a plurality of protrusions forming a plurality of raised contact surfaces and a base surface, and an effective amount of an adhesive distributed in said layer such that the adhesive substantially continuously diffuses to the surface of the embossed area to keep the embossed area sufficiently tacky that the cling wrap will cling to a variety of surfaces for an extended time period.

29. The cling wrap of claim 28, wherein said adhesive is present in the outer layer in an amount of from about 20 percent to about 70 percent of the total weight of said at least one outer layer.

30. The cling wrap of claim 28, comprising a polyolefinic resin.

31. The cling wrap of claim 28, comprising at least one polyolefinic resin selected from the group consisting of polyethylene and polypropylene resins.

32. The cling wrap of claim 28, wherein the total area of the raised contact surfaces comprise from about 3 to about 8 percent of the total surface area of the embossed area.

33. The cling wrap of claim 28, wherein one of the outer layers is essentially free of adhesive and comprises an effective amount of an antistatic agent to improve the handleability of the cling wrap.

34. The cling wrap of claim 28, wherein said antistatic agent comprises diethanolamine.

35. The cling wrap of claim 28, wherein said adhesive is a pressure sensitive adhesive suitable for direct contact with food.

36. The cling wrap of claim 28, wherein said adhesive is an optically clear, elastomeric pressure sensitive adhesive.

37. The cling wrap of claim 28, wherein said antistatic agent is selected from the group consisting of amines and ethanolamides.

38. The cling wrap of claim 28, wherein said adhesive comprises a mixture of low molecular weight polyisobutylenes and hydrocarbon resin tackifiers in an amount of from about 20 to about 70 percent by weight based on the total weight of the embossed layer and wherein the hydrocarbon resin tackifiers are present in the adhesive mixture in an amount of from about 1 to about 30 percent by weight of the adhesive mixture.

39. The cling wrap of claim 28 wherein said adhesive is an amorphous polyolefin material.

40. The cling wrap of claim 28 wherein said adhesive layer further comprises an amorphous polyolefin material in an amount of from about 10 to about 20 percent by weight and wherein said adhesive comprises a mixture of low molecular weight polyisobutylenes and hydrocarbon resin tackifiers in an amount of from about 20 to about 70 percent by weight based on the total weight of the embossed layer and wherein the hydrocarbon resin tackifiers are present in said adhesive mixture in an amount of from about 1 to about 30 percent by weight of said adhesive mixture.

41. The cling wrap of claim 28, having a tear bar resistance force of about 25 grams to about 400 grams.

42. The cling wrap of claim 28, wherein said core layer is made from a low density polyethylene and said two outer layers are made from polypropylene.

43. The cling wrap of claim 38 wherein said low molecular weight polyisobutylenes have a molecular weight ranging from about 25,000 to about 60,000.

* * * * *